Figure 1:
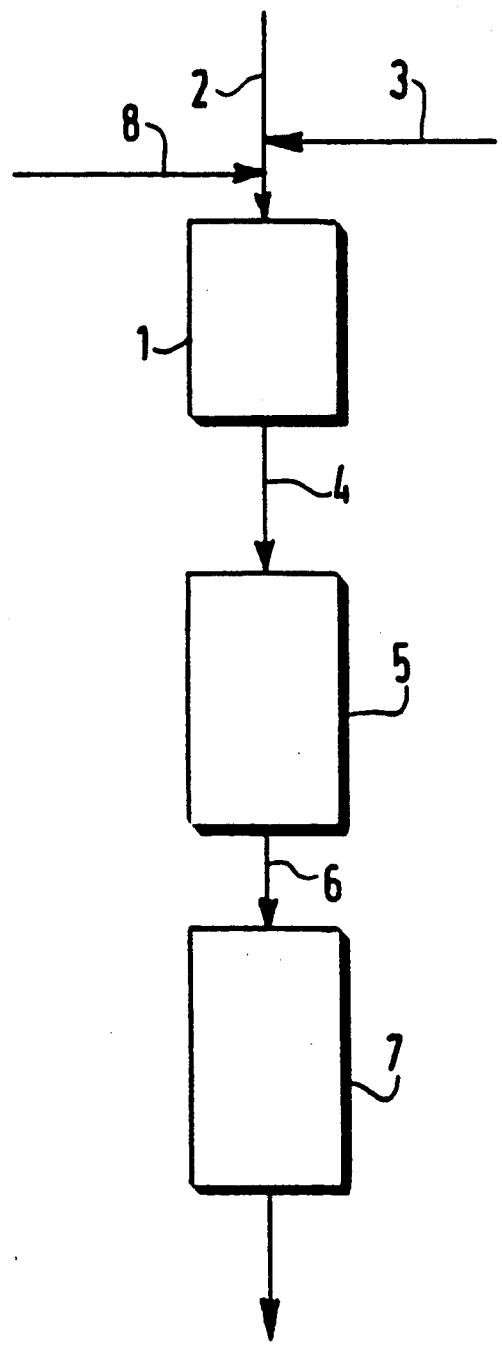

United States Patent [19]

Blondeau et al.

[11] Patent Number: 5,026,474

[45] Date of Patent: Jun. 25, 1991

[54] PROCESS FOR THE FIXED-BED SWEETENING OF PETROLEUM FRACTIONS

[75] Inventors: Rene Blondeau; Claude Marty, both of Le Havre; Patrick Ansquer, Lillebonne, all of France

[73] Assignee: Compagnie de Raffinage et de Distribution Total France, Le Vallois-Perret, France

[21] Appl. No.: 454,712

[22] Filed: Dec. 21, 1989

[30] Foreign Application Priority Data

Dec. 21, 1988 [FR] France .................. 88 16907

[51] Int. Cl.$^5$ ............................................. C10G 27/10
[52] U.S. Cl. ..................................... 208/189; 502/33; 502/29; 502/163; 208/204; 208/205
[58] Field of Search ................. 502/33, 163, 29; 39/4; 208/189

[56] References Cited

U.S. PATENT DOCUMENTS

| | | | |
|---|---|---|---|
| 2,744,854 | 5/1956 | Urban, Jr. .......................... | 208/206 |
| 2,988,500 | 6/1961 | Gleim et al. ........................ | 208/206 |
| 3,326,816 | 6/1967 | Urban .................................. | 502/33 |
| 3,472,786 | 10/1969 | Urban et al. ....................... | 208/189 |
| 3,513,088 | 5/1970 | Karabinas et al. ................. | 208/189 |
| 4,207,173 | 6/1980 | Stansky, Jr. . | |
| 4,213,877 | 7/1980 | Frame ................................. | 252/412 |
| 4,498,978 | 2/1985 | Frame ................................ | 208/189 |
| 4,502,949 | 3/1985 | Frame et al. ....................... | 208/189 |
| 4,686,775 | 8/1987 | Vauk .................................... | 502/31 |

FOREIGN PATENT DOCUMENTS 0948192  1/1964  United Kingdom .

Primary Examiner—Helane E. Myers
Attorney, Agent, or Firm—A. Thomas S. Safford

[57] ABSTRACT

A process for sweetening a petroleum fraction by catalytic oxidation of mercaptans contained therein in a fixed bed of the supported catalyst, with the oxidation reaction being carried out in the absence of an aqueous phase and in the presence of an oxidizing agent, and the water molecules formed during the oxidation reaction being removed from the catalyst support by washing the latter periodically with a substantial quantity of a polar solvent that is miscible with water.

20 Claims, 2 Drawing Sheets

PROCESS FOR THE FIXED-BED SWEETENING OF PETROLEUM FRACTIONS

The present invention relates to the fixed-bed sweetening of petroleum fractions by catalytic oxidation to disulfides of the mercaptans which they contain.

Theoretically, such oxidation can be achieved simply by mixing the petroleum fraction to be treated and an aqueous solution of an alkaline base, to which a catalyst based on a metal chelate is added, in the presence of an oxidizing agent However, the petroleum fraction and the aqueous solution of the alkaline base are not miscible, and it is at the interface of the two liquid phases that the mercaptans are converted to disulfides. (See, in this connection, French patent 1,249,134.)

With difficultly oxidizable mercaptans, it is preferable to treat the petroleum fraction by the use of a supported catalyst in the presence of an alkaline base and of an oxidizing agent, this process being known as "fixed-bed sweetening process."

The oxidizing agent, usually air, is mixed with the fraction to be sweetened. The alkaline base, generally an aqueous soda solution, is introduced either continuously or intermittently into the reaction medium to maintain the alkaline conditions necessary for the oxidation reaction The metal chelate used as catalyst is generally a metal phthalocyanine. (See, in this connection, French patent 1,301,844.)

The solid support used with this type of catalyst has a number of properties, particularly so far as its specific surface and its pore volume are concerned. Also, it must be insoluble in the basic solution used, and inert to the petroleum fraction being treated.

The support most frequently used is activated charcoal. However, a great many other supports have been proposed in the art. (See, in this connection, French patents 2,202,726, 2,321,329 and 2,524,818, or European patent 213,026, or U.S. Pat. Nos. 3,396,123 and 4,213,877.)

The earlier sweetening processes generally require the use of an aqueous basic solution, which it is advisable to purge after use because of the impurities from the feedstock and also because of the concentration of the base, which is reduced as a result of the water coming from the feedstock itself and from the oxidation reaction of the mercaptans to disulfides, which generates, in situ, one molecule of water per molecule of disulfide. (See French patents 2,347,433 and 2,338,322.)

To meet these requirements, it is occasionally possible to reuse in the crude-petroleum desalting unit the aqueous soda solutions which have become unfit for the sweetening of petroleum fractions. Unfortunately, sodium is thus being introduced into the crude petroleum. Now sodium is known to be a poison for most petroleum catalysts, and especially for the catalysts used in catalytic cracking units.

It has further been proposed to substitute organic solvents such as guanidines or quaternary ammonium compounds for the aqueous soda. (See, in this connection, French patent 2,343,043 or 2,338,322, or U.S. Pat. No. 4,207,173.) However, these processes are not only costly but they also do not eliminate the aforesaid disadvantages, mainly because of the formation during the reaction of one molecule of water for every molecule of disulfide.

The present invention seeks to overcome these drawbacks by proposing a process for the sweetening of a petroleum fraction by catalytic oxidation of the mercaptans which does not require the use of an aqueous solution of an inorganic or organic base.

To this end, the invention has as one embodiment a process for the fixed-bed sweetening of a petroleum fraction by catalytic oxidation of the mercaptans which it contains, said process being characterized in that the oxidation reaction is carried out in the absence of an aqueous phase and in the presence of an oxidizing agent, and that the water molecules formed during the oxidation reaction are then removed from the catalyst support by periodic washing of the latter with a substantial quantity of a polar solvent that is miscible with water.

This solvent should have a degree of polarity greater than about 35 on the Dimroth scale. (See Ann. 1963, 661.1.) Suitable for use are, in particular, primary or secondary monohydric and dihydric alcohols having from one to five carbon atoms, the ketones, certain amines, the nitriles, tetrahydrofuran, methyl ethyl ketone, dimethyl sulfoxide (DMSO) or dimethylformamide (DMF).

To carry out the oxidation reaction in the absence of an aqueous phase in accordance with the present invention, two types of supports impregnated with a catalyst based on a metal chelate may be employed:

Either conventional impregnated supports, for example, activated charcoals, by injecting with the feedstock, continuously or intermittently, small amounts of nonaqueous bases of a type known per se, such as ammonia, or primary, secondary or tertiary amines, as described in U.S. Pat. Nos. 2,744,854, 2,988,500 or 4,207,173, for example, or, in accordance with a particularly advantageous embodiment of the present invention, impregnated supports possessing intrinsically active sites tied to the presence of compounds of the alkali and/or alkaline-earth metal type integrated directly into the matrix of the catalyst support. (See, in this connection, European patent application 252,853, filed by the Applicants' Assignee.)

In both cases, the sweetening reaction of the mercaptans will result in the formation of one molecule of water for every two molecules of mercaptans according to the reaction scheme $$2R-SH + \tfrac{1}{2}O_2 \rightarrow R-S-S-R + H_2O,$$

where R is a hydrocarbon group. The water molecules so formed in the pores of the catalyst support will always have a more or less pronounced tendency, depending on the type of support used, to form in situ a heterogeneous medium which, contrary to what has been stated in the prior art, will reduce the yield of the reaction. In accordance with the present invention, this yield reduction can be advantageously prevented by periodic washing of the catalyst support with a substantial quantity of a nonaqueous polar solvent that is miscible with water under the reaction conditions.

This washing may advantageously be carried out continuously or intermittently with a substantial quantity of a solvent whose primary quality is that it will not dissolve the catalyst with which the support is impregnated.

The periodic washing with a water-miscible polar solvent may be carried out in working, for example, with two reactors operating in parallel by introducing into the reactor a substantial quantity of solvent, generally ranging from 10 to 100 percent by volume of the support, after shutting off the feedstock and optionally the anhydrous base. Among the polar solvents which may be chosen for the intermittent washings, solvents selected preferably for their good miscibility with water in any ratio and for their inertness to the impregnated catalyst even in strong concentration should be used. Ethanol will preferably be used for this purpose rather than methanol, provided that this less expensive solvent will not dissolve catalysts such as phthalocyanines even in strong concentration, and that it can be readily redistilled after use.

The periodic washing may advantageously also be carried out without stopping the sweetening reaction, by periodic injection into the feedstock of a substantial quantity (generally ranging from 10 to 100 percent, and preferably ranging from 10 to 30 percent, by volume of the catalyst support) of a polar solvent that is miscible with water under the reaction conditions. In this mode of washing, the volume ratio between the polar solvent and the feedstock advantageously ranges from 10 to 100 percent, and preferably from 30 to 60 percent. Among the polar solvents which are preferably used, polar solvents should be chosen which can be mixed into the hydrocarbon feedstock and are not apt to separate with the aqueous phase under the washing conditions. For this type of periodic washing, the polar solvent with the best washing qualities at the lowest cost may well be methanol.

The process of the invention lends itself well to the sweetening of all petroleum fractions and, in particular, to the sweetening of gasolines and kerosenes. These petroleum fractions actually contain very little water, their water content usually being considerably less than 500 ppm, and it is therefore mainly the molecules of water formed in situ during the oxidation reaction that are likely to be retained by the catalyst support. The water molecules consequently need not be desorbed too often by washing with a polar solvent in accordance with the present invention.

The conditions of the sweetening reaction of petroleum feedstocks without an aqueous phase are, on the whole, the same as the reaction conditions for the sweetening of mercaptans described in the prior art. For example, these reaction conditions may be as follows:
  Temperature: 20° to 60° C.
  Pressure: $10^5$ to $30.10^5$ pascals
  Quantity of oxidizing agent (air): 1 to 3
  Hourly space velocity (volume of feedstock per volume of catalyst per hour) 0.25 to 6

When the mercaptan content of the feedstock so treated exceeds a desired value, which generally is between 10 and 30 ppm, the catalyst is reactivated by continuous or intermittent washing with a polar solvent under the following conditions:
  Temperature: 10° to 90° C.
  Pressure: $10^5$ to $30.10^5$ pascals
  Hourly space velocity: 0.1 to 5
  Volume ratio of solvent to support: 0.1 to 1
  Frequency of regeneration: 3 to 10 weeks,
depending on the nature of the support and of the feedstock, and particularly on its initial water and mercaptan contents.

As metal chelate, any chelate used in the prior art for this purpose, and particularly the phthalocyanines of a metal, and more particularly cobalt phthalocyanine, may be deposited on the catalyst. This phthalocyanine should be deposited on a support containing from 5 to 100 percent of carbon.

Such a support may therefore consist of activated charcoal of a type known per se. In this case, the base necessary for the sweetening reaction should be nonaqueous and soluble in the feedstock to be treated and should be injected continuously or intermittently therewith.

However, in accordance with a preferred embodiment of the present invention, the catalyst support may advantageously be a composite produced by intimately mixing a carbonaceous compound and aluminosilicates containing, in particular, substantial quantities of alkali or alkaline-earth metal compounds, such as the water-insoluble salts of potassium or sodium, whose presence will make it possible to dispense with the injection of a nonaqueous base into the feedstock to be treated. (See, in this connection, European patent application 252,853.) The advantages of the present invention will then be all the more apparent as this type of support has an intrinsic tendency to trap the water molecules furnished by the feedstock or formed during the reaction.

The accompanying diagrammatic drawings, which have no limitative character whatsoever, illustrate embodiments of the process of the invention. In these drawings, FIG. 1 is a diagram illustrating a continuous mode of implementing the process of the invention, and FIG. 2 is a diagram illustrating an intermittent mode of implementing the process of the invention, with two reactors in parallel.

In the case of FIG. 1, the petroleum fraction to be sweetened, optionally combined with a nonaqueous base, is fed to the reactor 1 through the line 2, in which the oxidizing agent, which may be air, for example, is introduced directly through the line 3. The treated petroleum fraction is discharged through the line 4, which routes it to a filter system 5 based on activated charcoal, clay, sand or another material and designed to remove the traces of water and the nascent sulfur which are often produced during the oxidation of the mercaptans and not retained by the support. The treated feedstock is then transferred through the line 6 to a storage tank 7.

When the mercaptan content of the effluents from the sweetening reaction, measured in line 4 or downstream thereof, exceeds the specified value, which generally is of the order of 10 ppm of mercaptans, a substantial quantity of a polar solvent that is miscible with water and with the feedstock is, in accordance with the present invention, continuously injected into line 2 through the line 8.

Figure 2:
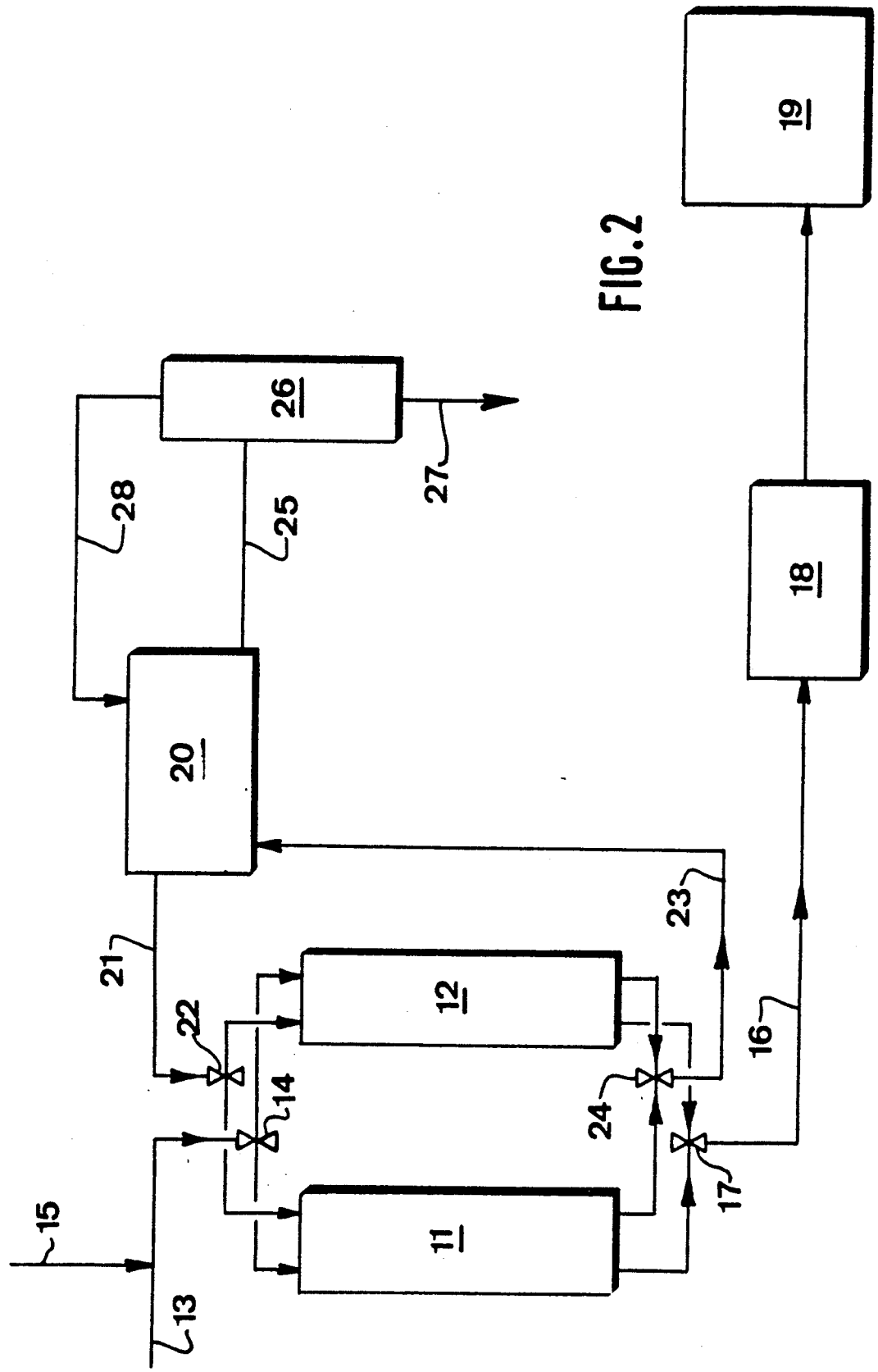

According to FIG. 2, the petroleum fraction to be sweetened, optionally combined with a nonaqueous base, is fed to the reactors 11 and 12 through the line 13, a valve 14 permitting either reactor to be supplied. The oxidizing agent, which may be air, for example, is introduced through the line 15 directly into line 13 upstream of the valve 14.

The petroleum fraction so treated is discharged through a line 16, which a valve 17 permits to be connected at will to the particular reactor, 11 or 12, where the sweetening is being carried out.

The discharge line 16 leads to a filter system 18 based on activated charcoal, clay, sand or another material and designed to remove the traces of water and the nascent sulfur, the treated feedstock then being stored in a tank 19.

The reactivation of the catalyst is carried out by washing in either reactor 11 or reactor 12, supplied with a nonaqueous polar solvent from a tank 20 through a line 21 provided with a valve 22. The solvent is then recovered at the base of the reactors through a line 23, connected by means of a valve 24 to the particular reactor in which the regeneration is taking place, and recycled to the tank 20.

Periodically, the solvent in the tank 20 is separated from the water which it contains by routing a solvent through a line 25 to a distillation column 26, at the base of which the water is discharged through 27, while the dewatered solvent is recovered overhead through the line 28 and recycled to the tank 20.

The flowsheets shown in FIGS. 1 and 2 are particularly easy to implement since they eliminate the costly systems for introducing an aqueous soda solution, as well as the systems for separating and discharging it.

As will be apparent from the examples which follow and which are not limitative, the implementation of the process of the invention proves particularly effective in the sweetening of petroleum fractions, even those considered difficult to treat, and the catalyst employed has a long-term stability significantly better than that of the known type of sweetening catalysts.

EXAMPLE 1

The composite catalyst used in this example was prepared as described in European patent application 252,853, cited earlier. After the support has been impregnated with a sulfonated cobalt phthalocyanine of the type marketed by the French company Procatalyse under the trade name "LCPS", this catalyst is present in granular form and, after drying, contains mainly about 1.5 kg of chelate per m$^3$ of support, and
an inorganic support containing approximately
10 percent by weight of carbon,
20 percent by weight of silicon, and
8 to 9 percent by weight of insoluble potassium salts.

The granular material has a specific surface of about 50 m$^2$/gram.

The composite is placed directly into a reactor whose height-to-diameter ratio is about 5. The composite is then fully dried by being cleaned with ethyl alcohol, for example, by passing at ambient temperature an equal volume of industrial ethanol over the fixed catalyst bed at an hourly space velocity of 1 v/v/hr.

Two feedstocks, $C_1$ and $C_2$, are then treated in the reactor, $C_1$ being a feedstock that is very difficult to refine, namely, a kerosene from Iraq containing 300 ppm of mercaptans, and $C_2$ being a more conventional feedstock less difficult to refine than $C_1$, namely, a kerosene from Iran containing 150 ppm of mercaptans.

These feedstocks have the following characteristics:

|  | $C_1$ | $C_2$ |
| --- | --- | --- |
| Aromatic compounds, percent by volume | 17 | 18 |
| Olefins, percent by volume | <5 | <5 |
| Saturated hydrocarbons, percent by volume | 76 | 75 |
| Mercaptan content, ppm by volume | 300 | 150 |
| Water content, ppm by weight | <150 | <150 |

Air is used as oxidizing agent. No aqueous solution is used.

The operating conditions are as follows:

Temperature: 40° C.
Pressure: 20 bars
Air feed rate: 2 standard liters per gram of sulfur
Hourly space velocity (volume of feedstock per volume of catalyst per hour): 0.7 v/v/hr The mercaptan content of the treated feedstock, after sweetening under these conditions, is less than 10 ppm for both feedstock $C_1$ and feedstock $C_2$.

It is found that the activity of the catalyst decreases very slowly with time. At the end of three weeks of continuous use with the feedstock $C_1$, the mercaptan content of the sweetened feedstock is only 15 ppm.

After shutting off the feedstock and the oxygen, the catalyst is reactivated by washing with industrial ethanol (at a concentration of from 90 to 95 percent) under the following conditions:

Temperature 40° C.
Pressure: 20 bars
Quantity of industrial ethanol: 100 percent by volume of support
Duration of ethanol injection: 10 minutes The sweetening operation is resumed and it is found that the mercaptan content of the treated feedstock again is less than 10 ppm for both types of feedstocks. This cycle of reaction/reactivation of the catalyst is repeated as many times as necessary.

As a variant, the reactivation of the catalyst may also be carried out without shutting off the feedstock and oxidizing agent. To this end, 12 percent by volume of methanol, based on the volume of the support, is preferably injected into the feedstock at 40° C. over a period of about 15 minutes.

EXAMPLE 2

In this example, a feedstock of kerosene of the Iraq type is sweetened by the use of a catalyst deposited on a fixed bed of activated charcoal. The reaction is carried out in the presence of oxygen, this time with continuous injection of a nonaqueous Lewis base, which here is tetrabutylammonium hydroxide (TBAH).

An activated charcoal supplied by American Norit Co., Inc., is impregnated in a manner known per se with phthalocyanine from the same source as that of Example 1.

The composite contains about 10 kg of active substance per m$^3$ of activated charcoal.

As in Example 1, the fixed catalyst bed is fully dried by washing under the same conditions as in Example 1.

The operating conditions thus are:

Temperature: 40° C.
Pressure: 20 bars
Air feed rate: 2 standard liters per gram of sulfur
Hourly space velocity of feedstock: 0.7 v/v/hr Since the amount of TBAH (about 6 ppm) injected with the feedstock is very small, there is no need to eliminate it after the reaction.

As in the preceding example, the kerosene so treated has a mercaptan content of less than 10 ppm at the start of the cycle. As soon as this content tends to exceed a limit of about 15 ppm, which will occur at the end of about three to four weeks, the catalyst is reactivated in accordance with the present invention under the same conditions as those described in Example 1, that is, when the feedstock is shut off, by injection of a half-volume of industrial ethanol, based on the catalyst support; and when the feedstock is not shut off, by injection into the feedstock of about one-sixth by volume of industrial methanol, based on the support, at a concentration of about 55 percent, based on the feedstock. After concentration, the mercaptan content of the treated feedstock returns to its initial value.

This specification is based upon a French priority document, France No. 88 16907, filed Dec. 21, 1988, which is incorporated herein by reference.

What is claimed is:

1. A process for reducing the mercaptan content of a petroleum fraction comprising oxidizing the petroleum fraction with a supported catalyst in a fixed bed in the absence of an aqueous phase and in the presence of an oxidizing agent, and removing from the supported catalyst the water molecules formed during the oxidation reaction by periodic washing of the supported catalyst with a substantial quantity of a polar solvent that is miscible with water.

2. A process as defined in claim 1, wherein the water-miscible polar solvent has a degree of polarity greater than about 35 on the Dimroth scale and which does not dissolve the catalyst.

3. A process as defined in claim 2, wherein the polar solvent is a primary or secondary monohydric or dihydric alcohol having from one to five carbon atoms, a ketone, an amine, a nitrile, tetrahydrofuran, methyl ethyl ketone, dimethyl sulfoxide or dimethylformamide.

4. A process as defined in claim 1, wherein the periodic washing of the supported catalyst is carried out with a quantity of polar solvent greater than 10 percent by volume of the supported catalyst.

5. A process as defined in claim 4, wherein the washing is carried out periodically by the relatively brief continuous introduction into the petroleum fraction of a quantity ranging from 10 to 100 percent, by volume of polar solvent, based on the petroleum fraction.

6. A process as defined in claim 5, wherein the quantity of polar solvent is from 30 to 60 percent by volume.

7. A process as defined in claim 5, wherein the polar solvent is methanol.

8. A process as defined in claim 4, wherein the washing of the supported catalyst and the sweetening of the petroleum fraction are carried out alternately, by shutting off briefly the petroleum fraction to be treated and by introducing a quantity by volume of polar solvent greater than 10 percent by volume of the supported catalyst.

9. A process as defined in claim 8, wherein the water-miscible polar solvent is ethanol.

10. A process as defined in claim 1, wherein the periodic washing is carried out in less than an hour every three to ten weeks.

11. A process as defined in claim 1, wherein the periodic washing is carried out at a temperature of from 10° to 90° C. and at an hourly space velocity of from 0.1 to 5 v/v/hr.

12. A process as defined in claim 1, wherein the oxidation reaction is carried out at a temperature ranging from 20° to 60° C., a pressure of between 1 and 30 pascals, and an hourly space velocity of from 0.25 to 6 v/v/hr.

13. A process as defined in claim 12, wherein the supported catalyst comprises from 5 to 100 percent by weight of carbon on which a metal chelate is deposited.

14. A process as defined in claim 13, wherein the metal chelate is cobalt phthalocyanine.

15. A process as defined in claim 14, wherein the support contains compounds selected from the group consisting of alkali and alkaline-earth metal compounds.

16. A process as defined in claim 15, wherein the oxidizing agent is air; the water-miscible polar solvent has a degree of polarity greater than about 35 on the Dimroth scale, does not dissolve the catalyst and is a primary or secondary monohydric or dihydric alcohol having one to five carbon atoms, a ketone, an amine, a nitrile, tetrahydrofuran, methyl ethyl ketone, dimethyl sulfoxide or dimethyl formamide; and the periodic washing of the supported catalyst is carried out with a quantity of polar solvent greater than 10 percent by volume of the supported catalyst.

17. A process as defined in claim 16, wherein the periodic washing begins when the mercaptan content of the product is greater than 10–30 ppm and continued until the mercaptan content of the product is less than 10 ppm.

18. A process as defined in claim 17, wherein the washing is carried out periodically by the relatively brief continuous introduction into the petroleum fraction of a quantity ranging from 10 to 100 percent, by volume of polar solvent, based on the petroleum feed stock.

19. A process as defined in claim 18, wherein the polar solvent is methanol.

20. A process as defined in claim 17, wherein the washing of the supported catalyst and the sweetening of the petroleum fraction are carried out alternately, by shutting off briefly the petroleum fraction to be treated and by introducing a quantity by volume of polar solvent greater than 10 percent by volume of the supported catalyst.

* * * * *